(12) United States Patent
Ogura et al.

(10) Patent No.: US 8,089,548 B2
(45) Date of Patent: Jan. 3, 2012

(54) IMAGE PROCESSING DEVICE, METHOD, AND STORAGE MEDIUM

(75) Inventors: Yasunobu Ogura, Osaka (JP); Yusuke Monobe, Kyoto (JP); Shinya Kojima, Aichi (JP); Yukiyasu Fukami, Aichi (JP); Keiichi Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 262 days.

(21) Appl. No.: 12/663,594

(22) PCT Filed: Apr. 9, 2009

(86) PCT No.: PCT/JP2009/001654
§ 371 (c)(1),
(2), (4) Date: Dec. 8, 2009

(87) PCT Pub. No.: WO2009/125596
PCT Pub. Date: Oct. 15, 2009

(65) Prior Publication Data
US 2010/0177234 A1    Jul. 15, 2010

(30) Foreign Application Priority Data
Apr. 11, 2008   (JP) .................................. 2008-103509

(51) Int. Cl.
*H04N 5/222* (2006.01)

(52) U.S. Cl. ................................. 348/333.01; 348/222.1

(58) Field of Classification Search ............. 348/333.01, 348/333.02, 333.03, 222.1, 345, 333.11, 348/333.12; 382/164, 168, 195, 203
See application file for complete search history.

(56) References Cited

U.S. PATENT DOCUMENTS

| 7,705,908 B2* | 4/2010 | Fredlund et al. ............... 348/349 |
| 2004/0207600 A1* | 10/2004 | Zhang et al. ................... 345/156 |
| 2006/0221090 A1* | 10/2006 | Takeshima et al. ........... 345/582 |
| 2007/0236729 A1* | 10/2007 | Yoda ............................ 358/1.15 |

FOREIGN PATENT DOCUMENTS

| JP | 2003-6654 | 1/2003 |
| JP | 2004-252748 | 9/2004 |

* cited by examiner

*Primary Examiner* — Nelson D. Hernández Hernández
(74) *Attorney, Agent, or Firm* — Wenderoth, Lind & Ponack, LLP

(57) ABSTRACT

An image processing device appropriately extracts an entire object from an image even if the object is not completely included in an initial region designated by a user. The image processing device includes: a designation unit designating a position on the image; a setting unit setting a first combination consisting of a first object region candidate and a first background region candidate, and a second combination; a histogram generation unit generating a normalized color histogram of each of the regions; a similarity calculation unit calculating a similarity regarding each of the combinations; and a selection unit configured to select a combination from the first and second combinations so that the selected combination has the similarity lower than the similarity of the non-selected combination.

9 Claims, 13 Drawing Sheets

IMAGE PROCESSING DEVICE, METHOD, AND STORAGE MEDIUM

TECHNICAL FIELD

The present invention relates to a technology of extracting an object from an image.

BACKGROUND ART

In recent years, with the popularity of small electronic devices having an image capturing function, such as digital still cameras and digital camcorders, the image capturing functions have been significantly advanced.

For example, such an image capturing device generally has a display such as a liquid crystal display (LCD), and thereby a user can take pictures of an object, confirming resulting to-be-recorded video on the display.

In addition, among digital still cameras, there is an image capturing device capable of, when a shutter is being pressed halfway, (i) setting, as a region of an object (hereinafter, referred to also as an "object region"), a rectangle having a predetermined size measured using center coordinates on a display as a center, (ii) extracting features of the object from the object region, (iii) matching the firstly extracted features with an input image that is inputted after an input image from which the firstly extracted features are extracted, (iv) tracking the object, and (v) adjusting an auto focus (AF) function, an auto exposure (AE) function, and the like.

A conventional technology is that a user sets a rectangular region or an elliptic region including an entire object by a manual operation using a mouse, a touch pen, or the like, then color components for a background are estimated from the set region, then the color components for the background are removed from the set region to determine color components for the object, and eventually the object is extracted (see Patent Reference 1, for example). FIG. 19 is a block diagram of the conventional technology disclosed in Patent Reference 1. It should be noted that a conventional object tracking device 1600 (see FIG. 19) includes a function unit 1611, a function unit 1612, and function units 1601 to 1606. The characters assigned to each of the function units in FIG. 19 indicate processing performed by the corresponding function unit.

PRIOR ART

Patent Reference

[Patent Reference 1] Japanese Unexamined Patent Application Publication No. 2004-252748

DISCLOSURE OF INVENTION

Problems that Invention is to Solve

However, in the conventional technology, since the object is extracted from the region designated by the user, if the user cannot designate a region that includes the object completely, the entire objet cannot be extracted appropriately.

Furthermore, conventional user interfaces used in digital still cameras, digital camcorders, and the like have difficulty in designating a region of an object.

The present invention solves the above problems in the conventional technologies. An object of the present invention is to provide an image processing device, an image processing method, and a storage medium, which are capable of appropriately extracting an entire object merely when a user performs a simple operation, for example, merely when the user designates a part of a region of the object.

Means to Solve the Problems

In order to solve the problems in the conventional technologies, there is provided a following structure.

The image processing device according to an aspect of the present invention extracts an object from an image, the device including; a designation unit configured to designate a position on the image that is received; a setting unit configured to set a first combination and a second combination that is different from the first combination based on the position designated by the designation unit, the first combination consisting of a first object region candidate and a first background region candidate, and the second combination consisting of a second object region candidate and a second background region candidate; a histogram generation unit configured to generate a normalized color histogram of the first object region candidate, a normalized color histogram of the first background region candidate, a normalized color histogram of the second object region candidate, and a normalized color histogram of the second background region candidate; a similarity calculation unit configured to calculate (a) a similarity regarding the first combination and (b) a similarity regarding the second combination, (a) the similarity regarding the first combination being a similarity between the normalized color histogram of the first object region candidate and the normalized color histogram of the first background region candidate, and (b) the similarity regarding the second combination being a similarity between the normalized color histogram of the second object region candidate and the normalized color histogram of the second background region candidate; and a selection unit configured to select a combination from the first and second combinations based on the similarities calculated by the similarity calculation unit, the selected combination having the similarity lower than the similarity of the combination not selected.

Effects of the Invention

According to the present invention, plural sets of a combination of (a) a candidate for an object region (hereinafter, referred to also as an "object region candidate") and (b) a candidate for a background region (hereinafter, referred to also as a "background region candidate") are set based on a position designated by a user, and then a similarity between the object region candidate and the background region candidate is calculated, for each of the plural sets, using a color histogram of the object region candidate and a color histogram of the background region candidate. Thereby, the object can be extracted. Furthermore, color components for a background are determined using the color histogram of the object region candidate and the color histogram of the background region candidate, then the object region is extracted from the object region candidate and the background region, and the extracted object region (pixels, for example) is synthesized together. Thereby, a circumscribed region of the object, which includes the object, can be appropriately detected to extract the object.

BEST MODE FOR CARRYING OUT THE INVENTION

The following describes the embodiments of the present invention with reference to the drawings.

First Embodiment

Figure 1:
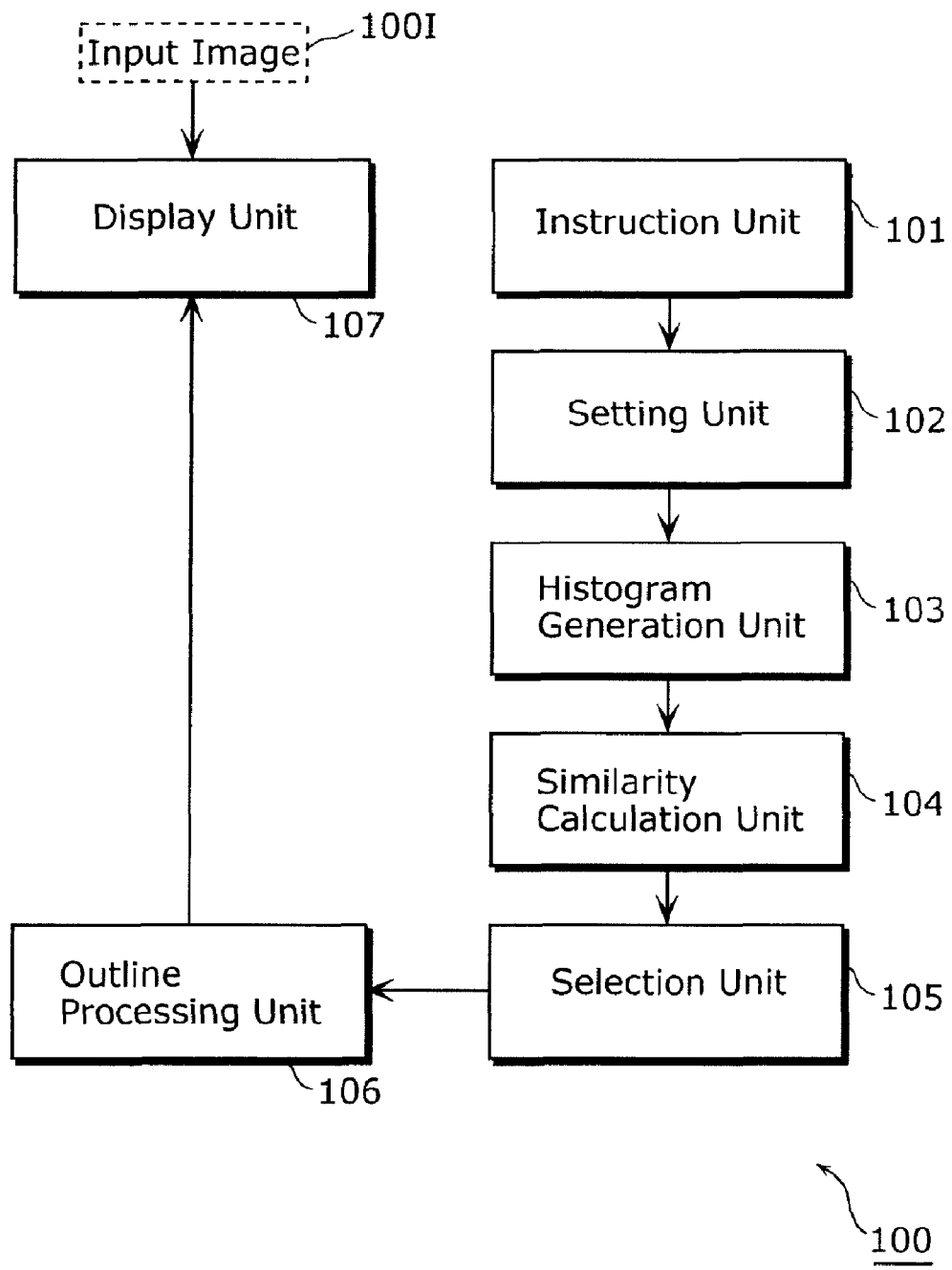
FIG. 1 is a block diagram of an image processing device according to a first embodiment of the present invention.

FIG. 1 is a block diagram of an image processing device 100 according to the first embodiment of the present invention.

As shown in FIG. 1, the image processing device 100, which extracts an object from an image, includes an instruction unit 101, a setting unit 102, a histogram generation unit 103, a similarity calculation unit 104, a selection unit 105, an outline processing unit 106, and a display unit 107.

Figure 17:
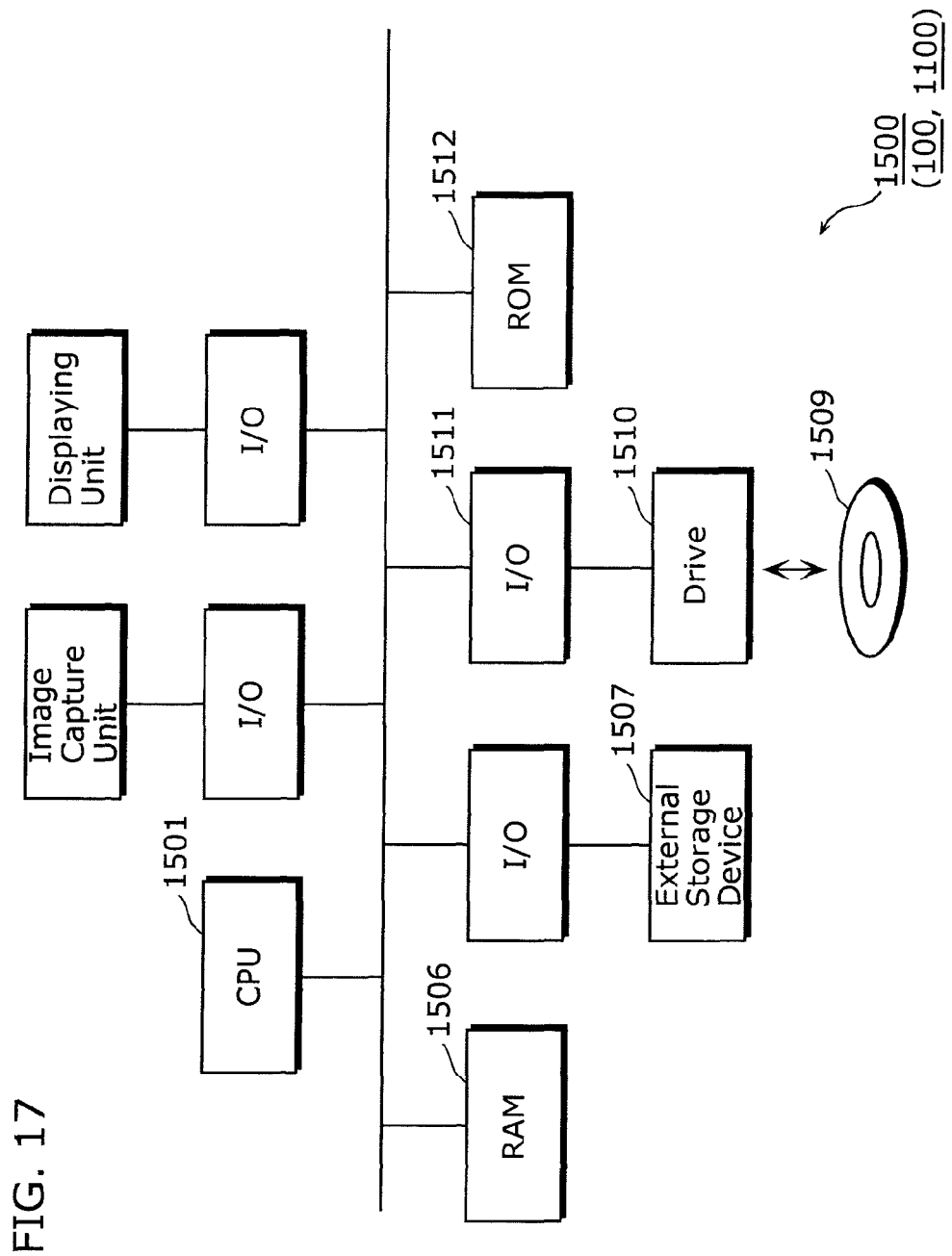
FIG. 17 is a block diagram of a storage medium according to an embodiment of the present invention.

It should be noted that each of these functional blocks such as the instruction unit 110 and the like may be implemented by, for example, executing a predetermined program by a CPU 1501 shown in FIG. 17. For instance, the image processing device 100 is a system 1500 shown in FIG. 17. It should also be noted that, if the functional blocks such as the instruction unit 110 and the like are implemented by a so-called object-oriented program, they can be considered as, for example, functional blocks having functions executed by one or more objects.

The image processing device 100 determines an object region (high-accuracy object region) matching an outline of an object obj, based on I object region candidates O_i (where $1 \leq i \leq I$, see FIG. 5) and the like. Here, as explained later in more detail, the high-accuracy object region is a relatively appropriate one from the I object region candidates O_i. Furthermore, the image processing device 100 is an image capturing device such as a digital camcorder that captures a still picture or video (see an input image 100I) including the object obj, or a component provided to such an image capturing device. Then, the image processing device 100 captures an image, for example, based on such a determined object region, with a focal point distance determined by the image processing device 100 or the like from a result of the determination of the object region. The determined object region is used in various kinds of processing using the object region, such as the above-mentioned processing of the auto focus (AF) function.

Figure 2:
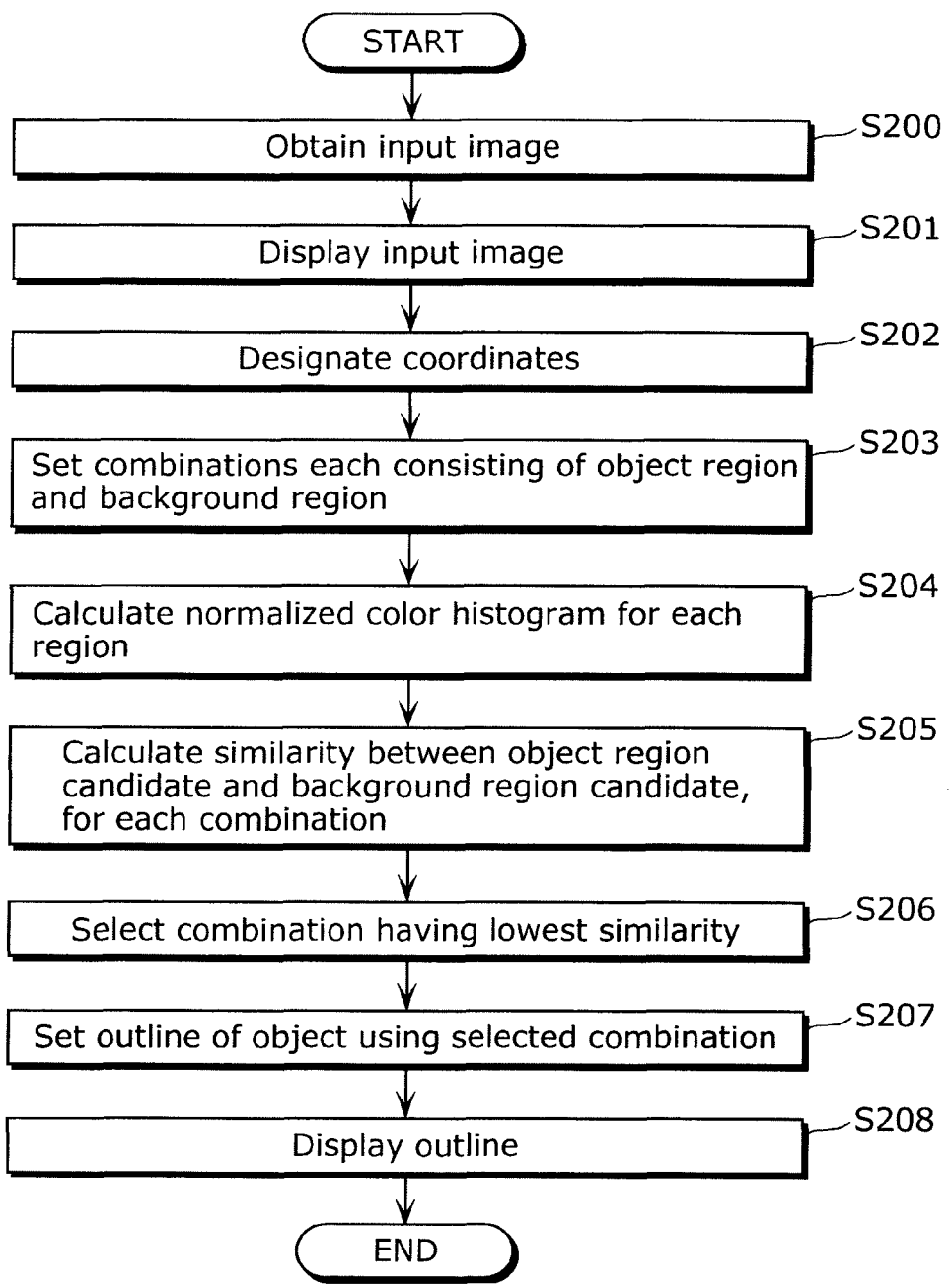
FIG. 2 is a flowchart of processing performed by the image processing device according to the first embodiment of the present invention.

FIG. 2 is a flowchart of processing performed by the image processing device 100 according to the first embodiment of the present invention.

First, the image processing device 100 receives the input image 100I (shown in FIG. 1) (Step S200).

Figure 3:
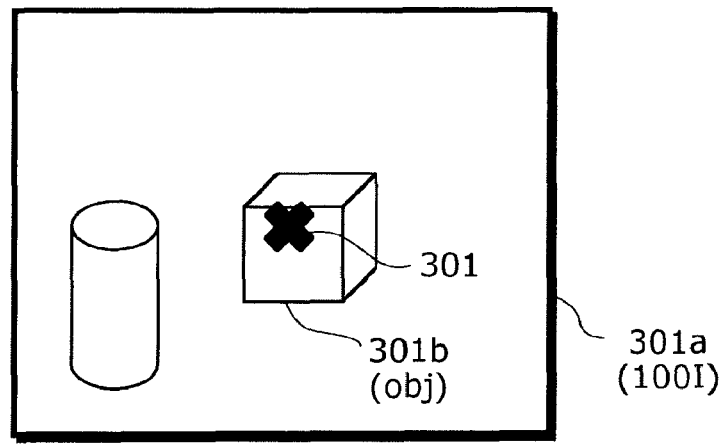
FIG. 3 is a diagram showing an example of position setting (setting of fixed coordinates) according to the first and second embodiments of the present invention.

FIG. 3 is a diagram showing the input image 100I displayed by the image processing device 100.

After receiving the input image 100I, the display unit 107 displays the received input image 100I (Step S201).

Next, the instruction unit 101 designates coordinates (coordinates of a part of the object) based on instructions from a user (Step S202). In more detail, the user designates coordinates of a part including in the object obj. It should be noted that the designation is explained later in more detail.

Figure 5:
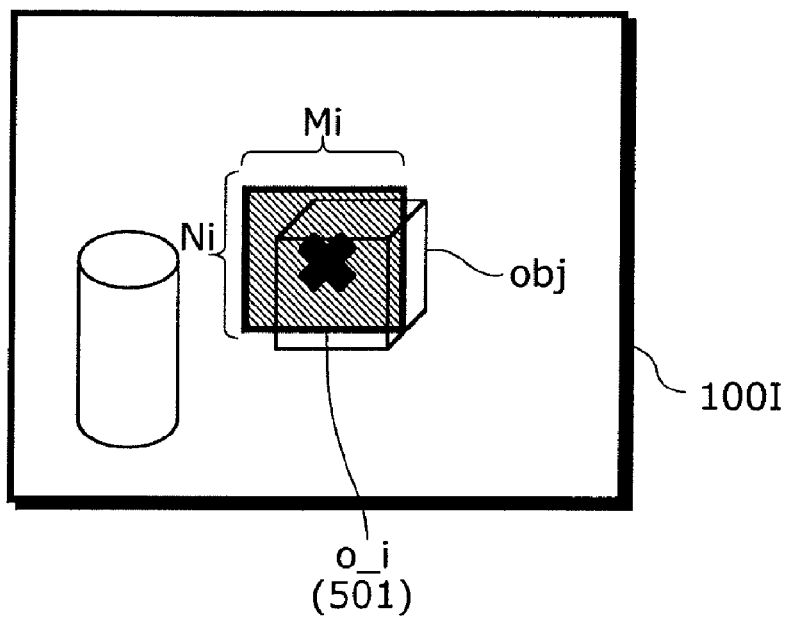
FIG. 5 is a diagram showing an example of setting of an object region candidate according to the first embodiment of the present invention.

FIG. 5 is a diagram showing an object region candidate 501 (namely, object region candidate O_i).

Figure 6:
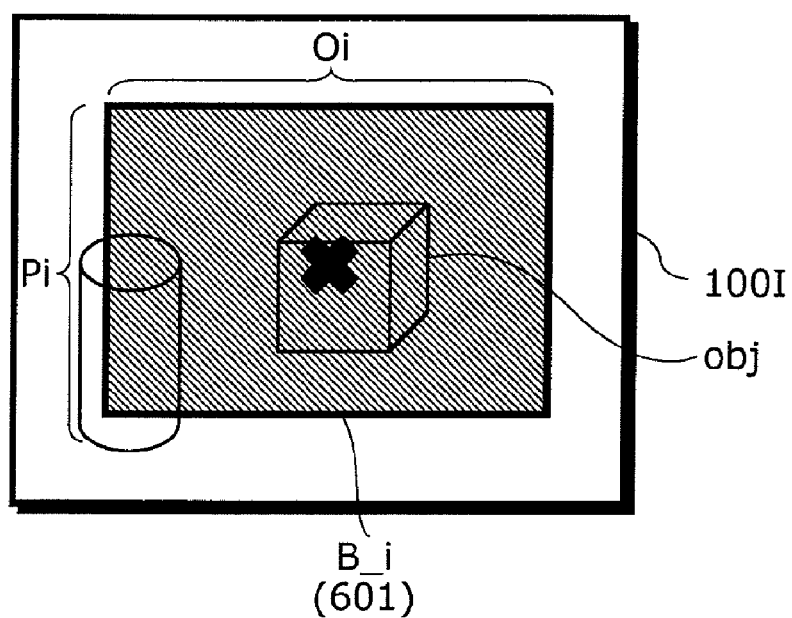
FIG. 6 is a diagram showing an example of setting of a background region candidate according to the first embodiment of the present invention.

FIG. 6 is a diagram showing a background region candidate 601 (namely, background region candidate B_i).

The setting unit 102 sets I sets of a combination of an object region candidate O_i and a background region candidate B_i based on the coordinates designated by the processing of the instruction unit 101 (Step S203, where $1 \leq i \leq I$) Here, it is assumed for convenience of explanation that the number of the sets (hereinafter, referred to as "combinations") is two (I=2, i=1 or 2). Of course, the number is not limited to two.

The histogram generation unit 103 calculates (a) a color histogram using image data of the object region candidates O_i and (b) a color histogram from image data of the background region candidates B_i for each of the combinations (Step S204). In more detail, the histogram generation unit 103 calculates, for each of the combinations, a color histogram of the object region candidate O_i using image data of an image corresponding to the object region candidate O_i from among the input image 100I. In addition, the histogram generation unit 103 calculates, for each of the combinations, a color histogram of the background region candidate B_i using image data of an image corresponding to the object region candidate B_i from among the input image 100I.

The similarity calculation unit 104 calculates a similarity L_i between the object region candidate O_i and the background region candidate B_i, using the color histogram of the object region candidate O_i and the color histogram of the background region candidate B_i. In other words, the similarity calculation unit 104 calculates, for each of the combinations, a similarity between the color histogram of the object region candidate O_i and the color histogram of the background region candidate B_i regarding the corresponding combination, thereby calculating I similarities (Step S205).

The selection unit 105 compares the calculated I similarities from one another, and selects one combination having the lowest similarity from the combinations (Step S206). In other words, the selection unit 105 compares a similarity regarding one combination to a similarity of the other combination. Then, the selection unit 105 selects a combination (hereinafter, referred to also as a "selected combination") having a similarity lower than a similarity of any other combination from among the combinations set by the setting unit 102.

The outline processing unit 106 determines color components for the background and color components for the object obj (see FIG. 5 and the like), based on the color histogram of the object region candidate O_s in the selected combination and the color histogram of the background region candidate B_s in the selected combination. Therefore, the outline processing unit 106 determines one or more colors included in the color components for the background. The determined one or more colors are color components forming the background (hereinafter, a color of color components is referred to also simply as a "color"). Such determination of each color in the color components for the background is referred to as determination of the color components for the background. In addition, the outline processing unit 106 determines one or more colors forming the object obj. It should be noted that the color histogram is explained later in more detail.

Furthermore, the outline processing unit 106 extracts pixels of the color components for the object obj from the input image 100I, and synthesizes the extracted pixels into a single object region (high-accuracy object region) (Step S207). In more detail, the outline processing unit 106 determines each pixel of the color components for the object obj from among pixels included in a predetermined addition region in the input image 100I, for example. Here, the addition region is, for example, a region that is collection of positions included in at least one of the object region candidate O_s and the background region candidate B_s in the selected combination. Then, the outline processing unit 106 determines a region consisting of all of the determined pixels, as the object region (high-accuracy object region).

Finally, the display unit 107 displays an outline of the synthesized object region (Step S208).

The following describes each of the steps in more detail.

First, at Step S201, the input image 100I is displayed.

At Step S202, the user of the image processing device 100 instructs coordinates of a position in the object obj on the input image 100I, confirming the displayed input image 100I. The instructed coordinates may be, for example, fixed coordinates on the displayed image (the input image 100I) at the timing of pressing an operation button of the image processing device 100, as shown in FIG. 3.

This means that the instruction unit 101 may determine one input image 100I from a plurality of input images 100I received by the image processing device 100. Then, the instruction unit 101 may determine the above-mentioned fixed coordinates (predetermined coordinates) on the determined input image 100I, as the coordinates of a part included in the object obj.

Figure 4:
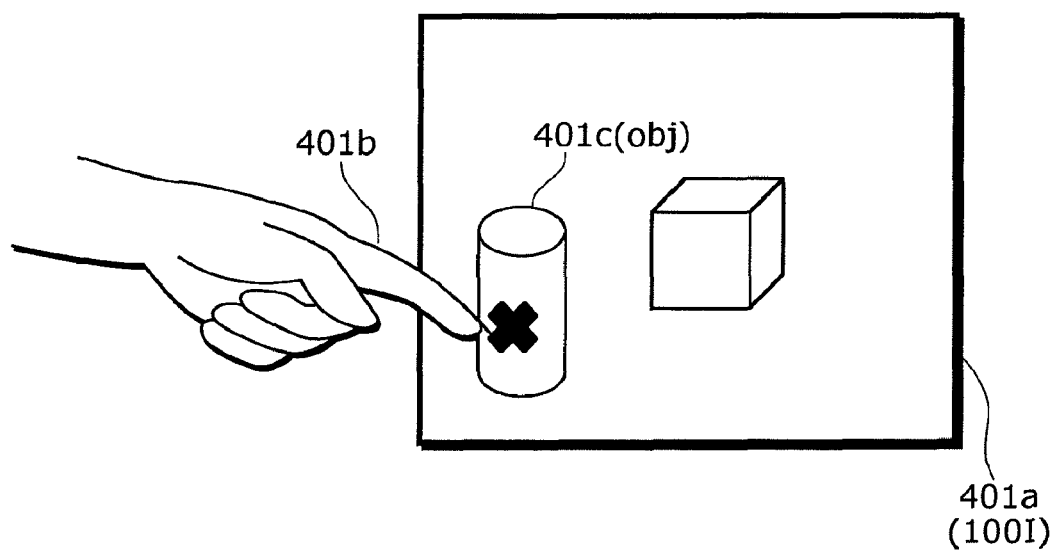
FIG. 4 is a diagram showing an example of position setting (touch panel) according to the first and second embodiments of the present invention.

FIG. 4 is a diagram showing an input image 401a in the case where coordinates are designated by touch of a finger 401b of the user.

It should be noted that the coordinates can be instructed when, for example, a touch panel device is provided on the display unit 107 and the user touches the panel as shown in FIG. 4. It is also possible to use an input device such as a mouse or a touch pen in order to instruct the coordinates.

In short, the instruction unit 101 determines coordinates (coordinates of a part of the object) which the user designates to the image processing device 100 as the coordinates of a part included in the object obj.

Next, at Step S203, as shown in FIG. 5, based on the coordinates designated by the user, the setting unit 102 sets an object region candidate O_i (where $1 \leq i \leq I$) having Mi pixels×Ni pixels. In addition, as shown in FIG. 6, based on the coordinates designated by the user, the setting unit 102 sets a background region candidate B_i (where $1 \leq i \leq I$) having Oi pixels×Pi pixels. Here, Mi<Oi, and Ni<Pi. It should be noted that each of the object region candidate 501 and the background region candidate 601 may be, for example, a region having a center with the coordinates determined by the instruction unit 101. It should also be noted that the background region candidate 601 may be, for example, a region including the corresponding object region candidate 501.

Figure 7:
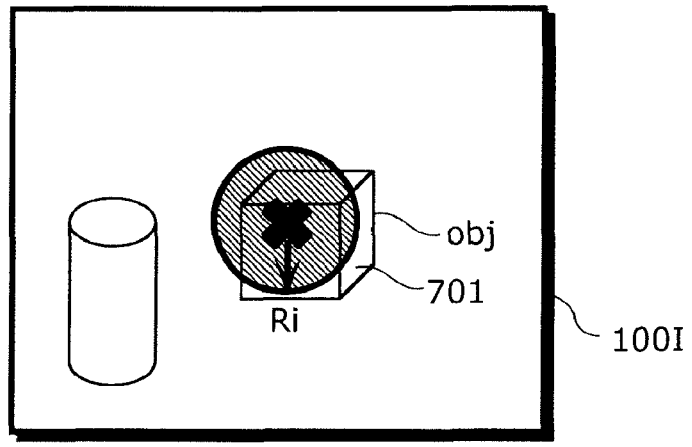
FIG. 7 is a diagram showing an example of setting of a region according to the first embodiment of the present invention.

FIG. 7 is a diagram showing a circular region 701.

Figure 8:
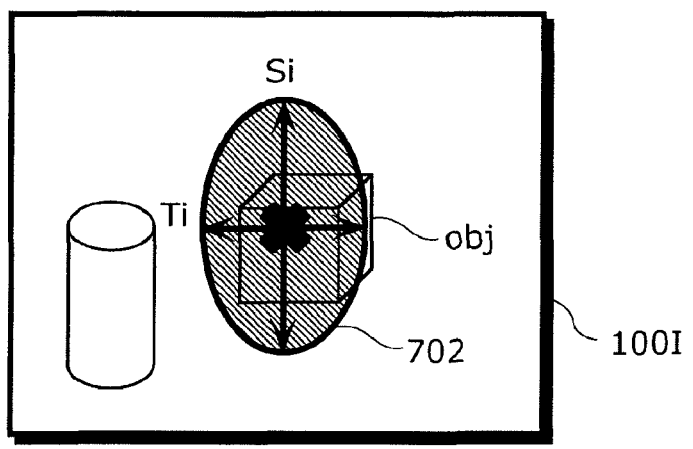
FIG. 8 is a diagram showing an example of setting of a region according to the first embodiment of the present invention.

FIG. 8 is a diagram showing an elliptic region 702.

Figure 9:
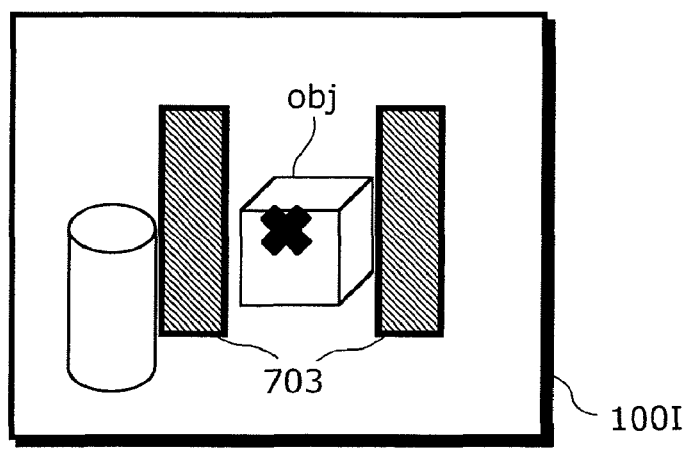
FIG. 9 is diagrams showing an example of setting of a region according to the first embodiment of the present invention.

FIG. 9 is a diagram showing a collective region 703 consisting of two or more regions apart from one another.

It should be noted that a shape of each of the object region candidate 501 and the background region candidate 601 is not limited to a rectangle. For example, one or both of the object region candidate 501 and the background region candidate 601 may be the circular region 701 having a radius Ri as shown in FIG. 7, or the elliptic region 702 having a long axis Si and a short axis Ti. It is also possible that one or both of these regions set by the setting unit 102 is the collective region 703 separated to two or more regions.

Then, at Step S204, firstly, the histogram generation unit 103 calculates a color histogram of each of the regions (each of the object region candidate O_i and the background region candidate B_i, where $1 \leq i \leq I$) which have been set at Step S203.

Figure 11:
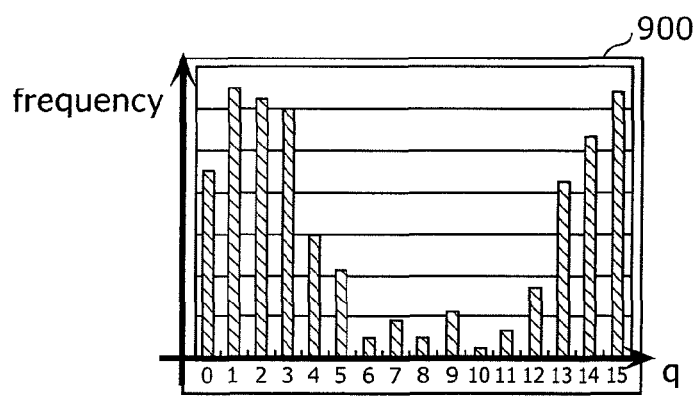
FIG. 11 is a graph showing an example of a color histogram.

FIG. 11 is a graph showing a color histogram 900.

The color histogram 900 is data for determining a frequency (numerical value) corresponding to each of predetermined various colors in a corresponding region. The determined numerical value indicates the number of pixels of a corresponding color represented by a numerical value, from among pixels included in an image of the color histogram 900. Here, for example, the number of the predetermined various colors is Q (where Q=16), which is described later. The color histogram 900 is explained later in more detail. In the color histogram 900 of FIG. 11, the horizontal axis shows respective 16 colors, and the vertical axis shows the number of pixels for each of the colors.

Figure 10:
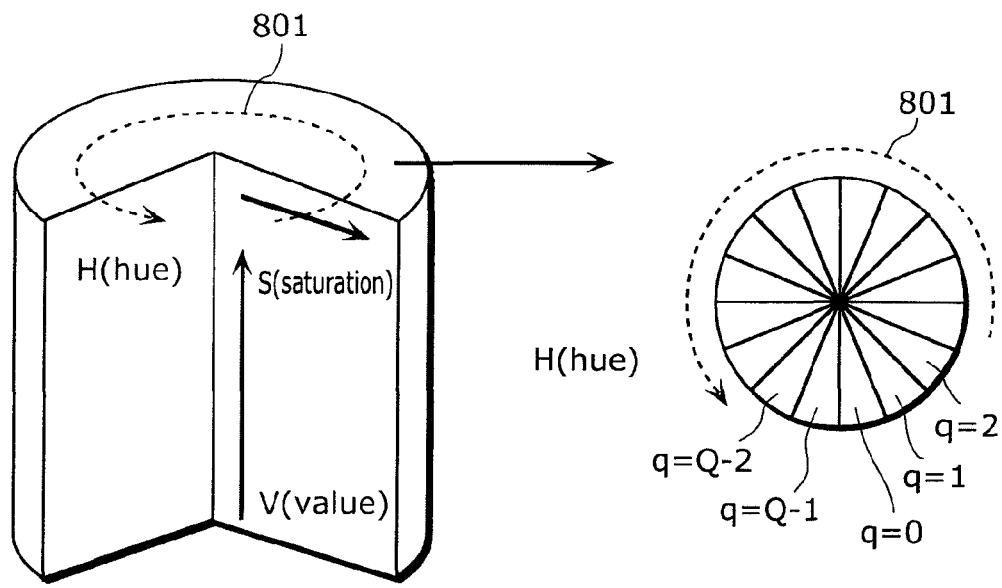
FIG. 10 is a diagram showing an example of a color space applied in the first and second embodiments of the present invention.

FIG. 10 is a diagram showing a color component axis 801 of a hue (H) of a Hue-Saturation-Value (HSV) color space.

Regarding the calculation of the color histogram, the histogram generation unit 103 generates an L-dimensional histogram in which each color component axis in the predetermined color space is divided into Q elements (pieces). In other words, in the generated color histogram, the number of colors, for which the number of pixels is to be determined, is Q colors, for example. Then, each of the colors is a corresponding one of the Q sub-spaced divided from the above-mentioned color space. For example, each of the Q subspaces is color of a corresponding element generated when a predetermined color component axis (for example, a color component axis of hue, where L=1) from among color component axes in the color space is divided into Q elements.

Here, it is assumed that Q=16 and L=1 as shown in FIG. 10, and that the color space is an HSV space. It is also assumed that the above-mentioned predetermined color component axis is a color component axis of H (hue). Based on the color component axis of H (hue), the histogram generation unit 103 generates a one-dimensional histogram (the color histogram 900 of FIG. 11) which is generated by dividing the color component axis of hue into 16 elements.

Then, the histogram generation unit 103 determines to which element each pixel in the object region candidate 501 belongs, among the 16 elements (colors) in the color space. The histogram generation unit 103 counts the number of pixels having a color included in each of the divided elements, thereby generating a color histogram of the object region candidate 501. The histogram generation unit 103 calculates a color histogram also for the background region candidate 601.

FIG. 11 shows an example of such a color histogram. The horizontal axis indicates a number q (where q=0, 1, 2, . . . , 15) representing a corresponding element (color). The vertical axis indicates a frequency of the color histogram, namely, the number of pixels having the color.

Assuming that a frequency (number of pixels) of the q-th element (where $O \leq Q \leq Q-1$) among the divided 16 elements is $D_q$, the total number of pixels (total pixel number) in the color histogram 900 can be determined by the following equation (1).

$$\text{Total Pixel Number} = \sum_{q=0}^{Q-1} D_q \quad \text{[Equation 1]}$$

Next, each frequency of each element in the color histogram 900 is divided by the total pixel number of the region to calculate a normalized histogram $ND_q$.

$$\text{Normalized Histogram } ND_q = \frac{D_q}{\sum_{q=0}^{Q-1} D_q} \quad \text{[Equation 2]}$$

The normalized histogram is normalized so that a sum of the elements is 1.

In other words, the normalized histogram is data for determining a ratio of (a) the number pixels of each color to (b) a total number of pixels in an image of the color histogram.

Next, at Step S205, a similarity between an object region candidate 501 and a background region candidate 601 in a combination is calculated. Here, a histogram intersection Sob shown in the following equation (3) is used as a scale for the similarity calculation. A similarity is calculated for each combination by the similarity calculation unit 104.

$$S_{ob} = \sum_{q=0}^{Q-1} \min(O_q, B_q) \quad \text{[Equation 3]}$$

Figure 12:
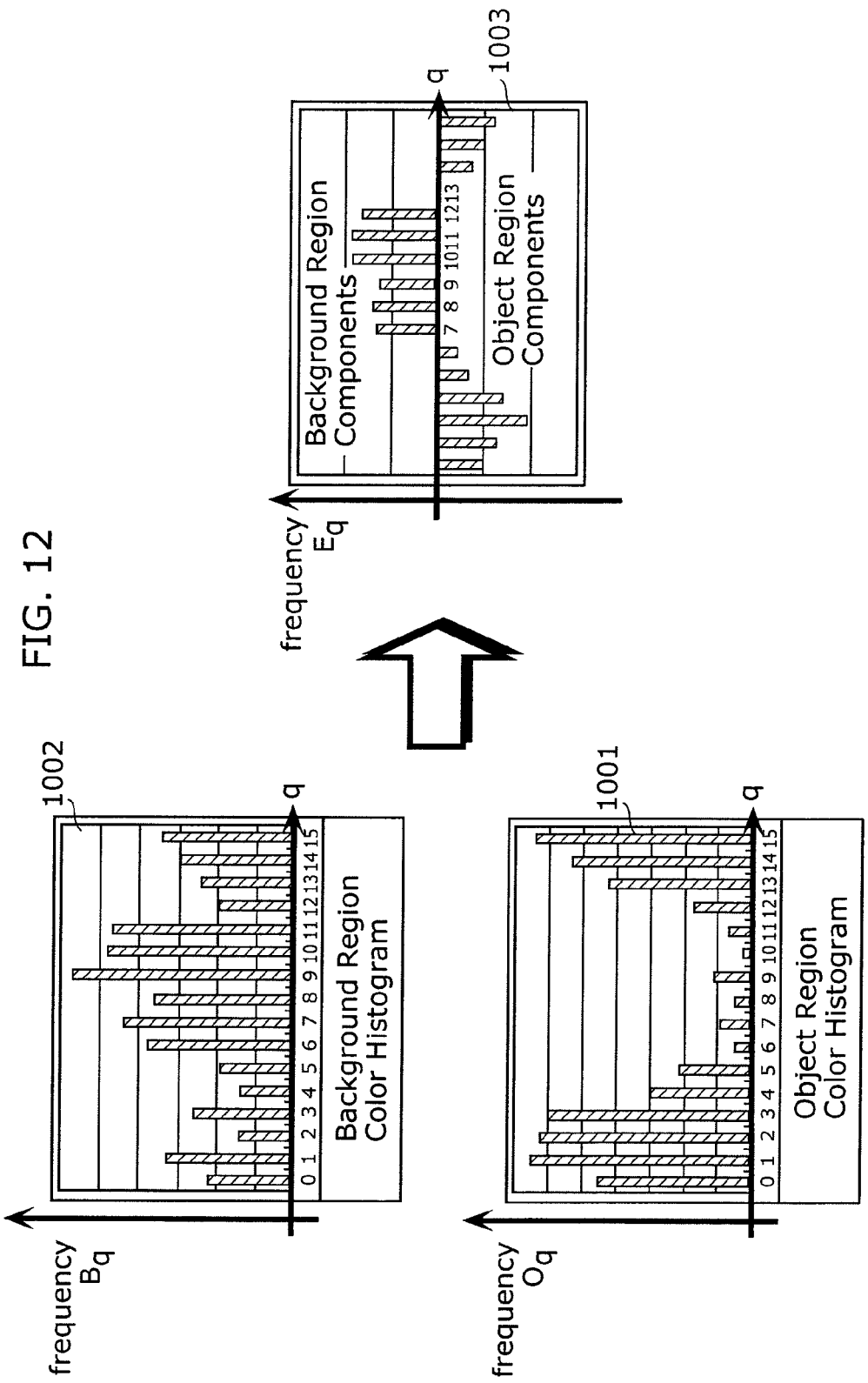
FIG. 12 is graphs showing an example of extracting color components for an object and color components for a background according to the first and second embodiments of the present invention.

FIG. 12 shows a normalized histogram 1001 of the object region candidate 501 and a normalized histogram 1002 of the background region candidate 601. These normalized histograms and a subtraction result histogram 1003 shown in FIG. 12 are explained later in more detail.

Here, $O_q$ shown in FIG. 12 represents a frequency of each element in the normalized histogram 1001 of the object region candidate 501, and $B_q$ represents a frequency of each element in the normalized histogram 1002 of the background region candidate 601. Each of the normalized histogram 1001 of the object region candidate 501 and the normalized histogram 1002 of the background region candidate 601 is normalized so that a sum of the elements is 1. Therefore, the histogram intersection Sob has a value ranging from 0 to 1.

In more detail, when a shape (FIG. 12) of the normalized histogram 1002 of the background region candidate 601 overlaps on a shape (FIG. 12) of the normalized histogram 1001 of the object region candidate 501, the histogram intersection Sob corresponds to an area of the overlapped region where these two shapes overlap with each other.

Then, as described previously, the setting unit 102 sets I sets of a combination consisting of an object region candidate 501 and a background region candidate 601. Then, for each of the I sets (namely, I combinations), the histogram generation unit 103 calculates (a) a color histogram 900 (normalized color histogram) of the object region candidate 501 (object region candidate O_i) and (b) a color histogram 900 (normalized color histogram) of the background region candidate 601 (background region candidate B_i) in the corresponding combination (i-th combination). Then, the similarity calculation unit 104 calculates a similarity between the calculated color histograms of each of the I combinations.

At Step S206, from among the I combinations for each of which a similarity has been calculated, a combination having the lowest similarity is selected by the selection unit 105 as an optimum combination of the object region candidate O_i and the background region candidate B_i.

The graph seen to the right-hand side in FIG. 12 shows a subtraction result histogram 1003.

Next, at Step S207, as shown in the equation (4), firstly, the outline processing unit 106 subtracts (a) a frequency of the element in the normalized histogram 1001 of the object region candidate O_i from (b) a frequency of each element in the normalized histogram 1002 of the background region candidate B_i, thereby determining which is higher between the frequencies. In other words, for each of colors of color components (hereinafter, simply as "colors"), the outline processing unit 106 subtracts (a) $O_q$ of the corresponding color in the normalized histogram 1002 from (b) $B_q$ of the corresponding color in the normalized histogram 1001. Thereby, the outline processing unit 106 calculates the subtraction result histogram 1003 in which a frequency of each color is a subtraction result $E_q$ that is a result of the above subtraction for each color.

$$E_q = B_q - O_q \quad \begin{array}{l} E_q < 0 \text{: color for background} \\ E_q > 0 \text{: color for object} \end{array} \quad \text{[Equation 4]}$$

If the subtraction result $E_q$ is a positive value, then the outline processing unit 106 decides that the element (color) for which the subtraction has been performed is a color of color components for the background. On the other hand, if the subtraction result $E_q$ is a negative value, then the outline processing unit 106 decides that the color is a color of color components for the object obj. FIG. 12 shows an example of the decision.

It is also possible to make the decision as follows, not by determining based on the subtraction result $E_q$ whether or not the color is a color of color components for the object. The outline processing unit 106 may determine, as colors of color components for the background, the first to the u-th colors in an order of a higher frequency in the normalized histogram 1002 of the background region candidate 601 in the selected combination, namely, colors from a color having the highest frequency to a color having the u-th higher frequency. The determined u colors are eliminated from color components in the normalized histogram 1001 in the object region candidate 501, and remaining color components are decided as color components for the object by the outline processing unit 106.

Next, the outline processing unit 106 extracts pixels of the decided color components for the object obj (for example, colors for each of which the number of pixels is equal to or more than a threshold value (for example 0) in the histogram that is a result of the calculation), from appropriate object region candidate 501 and background region candidate 601, such as the object region candidate 501 and the background region candidate 601 in the selected combination. Then, the outline processing unit 106 sets a rectangle so that the pixels for the object obj which are extracted from the object region candidate 501 and the background region candidate 601 are included in the rectangle. In other words, for example, the outline processing unit 106 determines, as an object region (high-accuracy object region), the smallest rectangle including all of the extracted pixels. It is also possible that the outline processing unit 106 uses, as the object region, a result of fitting the extracted pixels for the object obj to an ellipse (which is known as an ellipse fitting method). It is still possible that the outline processing unit 106 directly sets, as the object region, the object region candidate 501 in the combination (selected combination) selected at Step S206.

Finally, at Step S208, the image processing device 100 provides the display unit 107 with an outline of the rectangle or the ellipse set at Step S207. This allows the display unit 107 to display the determined object region (high-accuracy object region).

Second Embodiment

Figure 13:
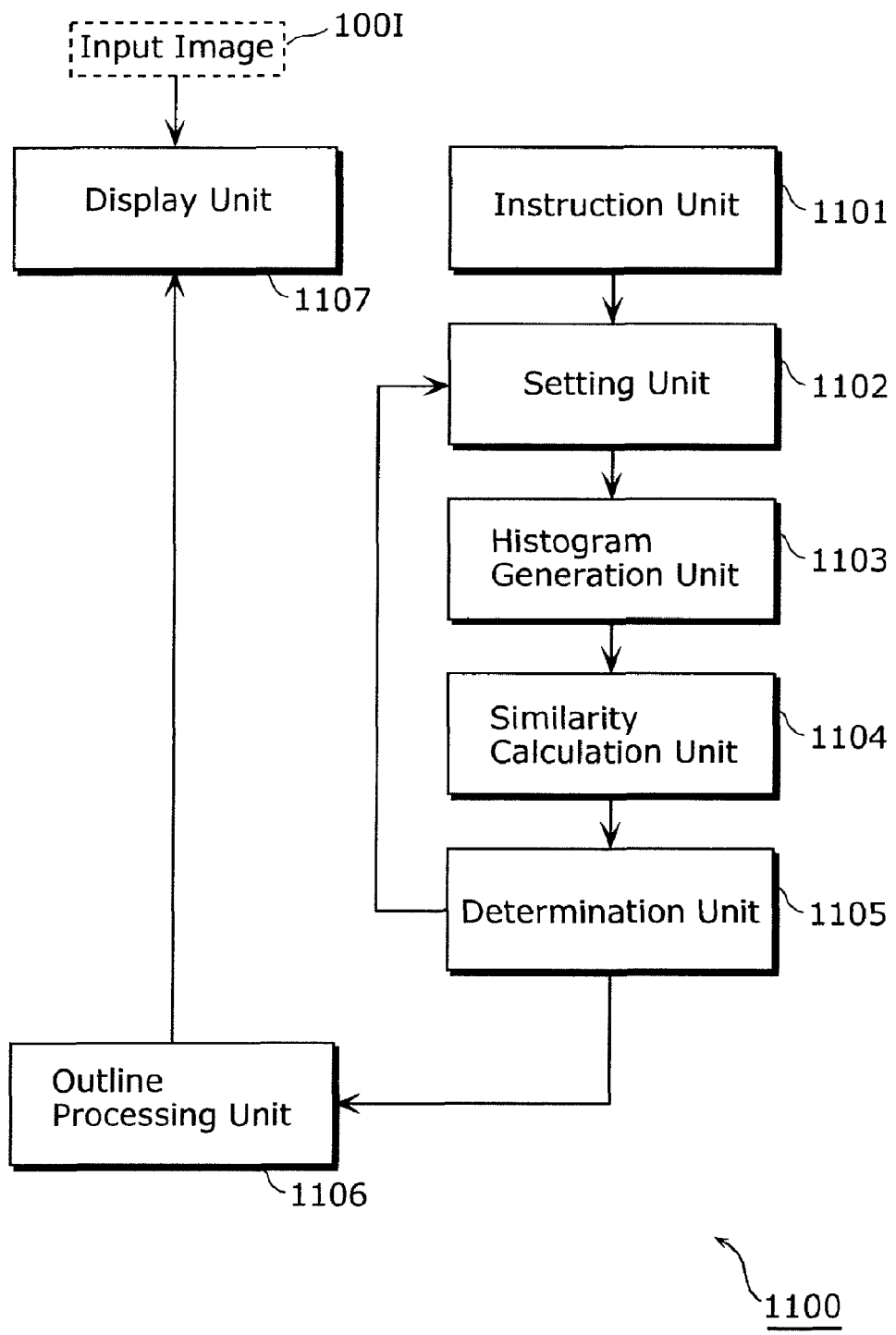
FIG. 13 is a block diagram of an image processing device according to the second embodiment of the present invention.

FIG. 13 is a block diagram of the image processing device 1100 according to the second embodiment of the present invention.

In FIG. 13, the image processing device 1100, which extracts an object from an image, includes an instruction unit 1101, a setting unit 1102, a histogram generation unit 1103, a similarity calculation unit 1104, a determination unit 1105, an outline processing unit 1106, and a display unit 1107.

Figure 14:
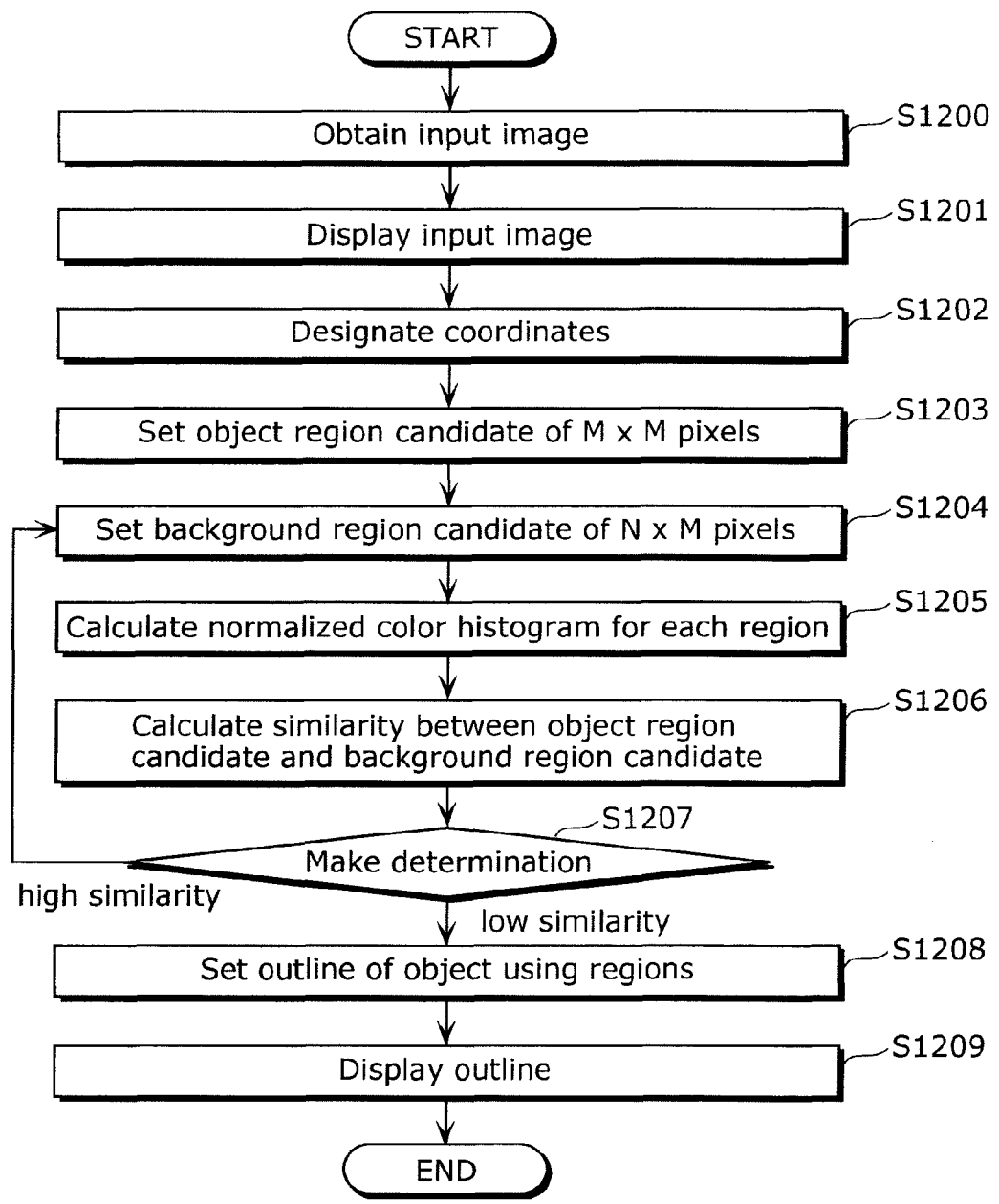
FIG. 14 is a flowchart of processing performed by the image processing device according to the second embodiment of the present invention.

FIG. 14 is a flowchart of processing performed by the image processing device 1100 according to the second embodiment of the present invention.

After the image processing device 1100 receives the input image 100I, (Step S1200) the display unit 1107 displays the received input image 100I (Step S1201).

The instruction unit 1101 designates coordinates based on instructions from the user of the image processing device 1100 (Step S1202).

Based on the designated coordinates, the setting unit 1102 sets (a) an object region candidate O_1 (object region candidate O_t, where t≧1) having M pixels×M pixels and (b) a background region candidate B_1 (background region candidate B_t, where t≧1) having N pixels×N pixels (Steps S1203, S1204).

The histogram generation unit 1103 calculates a color histogram of the object region candidate O_1 (object region candidate O_t) and a color histogram of the background region candidate B_1 (background region candidate B_t), using image data of the object region candidate O_1 (object region candidate O_t) and image data of the background region candidate B_1 (background region candidate B_t), respectively (Step S1205).

The similarity calculation unit 1104 calculates a similarity between the object region candidate O_1 (object region candidate O_t) and the background region candidate B_1 (background region candidate B_t), using the color histogram of the object region candidate O_1 (object region candidate O_t) and the color histogram of the background region candidate B_1 (background region candidate B_t) (Step S1206).

The determination unit 1105 makes a determination regarding the similarity (Step S1207).

When the determination regarding the similarity results in a predetermined result, the outline processing unit 1106 determines colors of color components for the background using the color histogram of the object region candidate O_t having the similarity and the color histogram of the background region candidate B_t having the similarity, then extracts pixels having the colors, and eventually synthesizes the extracted pixels together (Step S1208).

Finally, the display unit 1107 displays an outline of the object which is a result of the synthesis performed by the outline processing unit 1106 (Step S1209).

The following describes each of the steps in more detail.

Here, Step S1200, Step S1201 and Step S1202 are the same as Step S200, Step S201 and Step S202 in the first embodiment, respectively.

Figure 15:
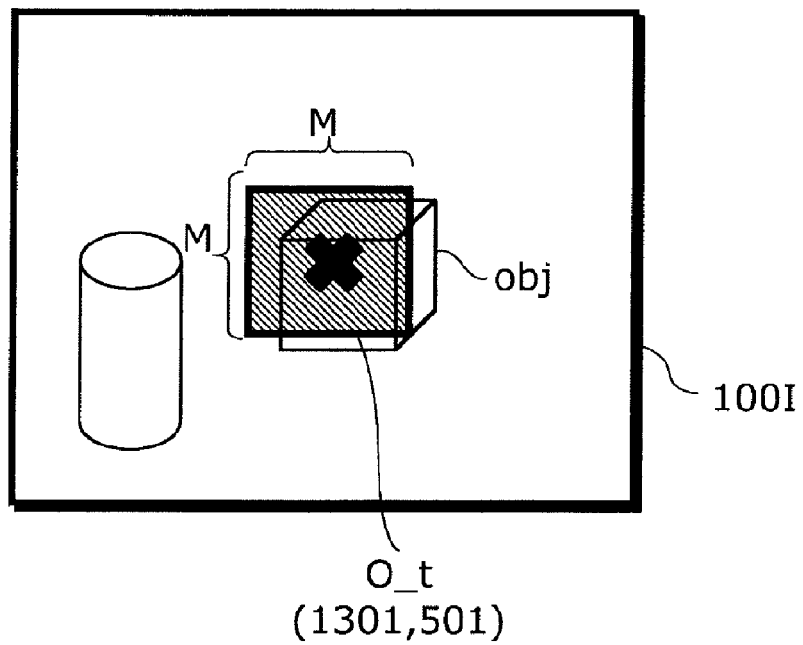
FIG. 15 is a diagram showing an example of setting of an object region candidate according to the second embodiment of the present invention.

FIG. 15 shows an object region candidate O_t (object region candidate 1301).

Figure 16:
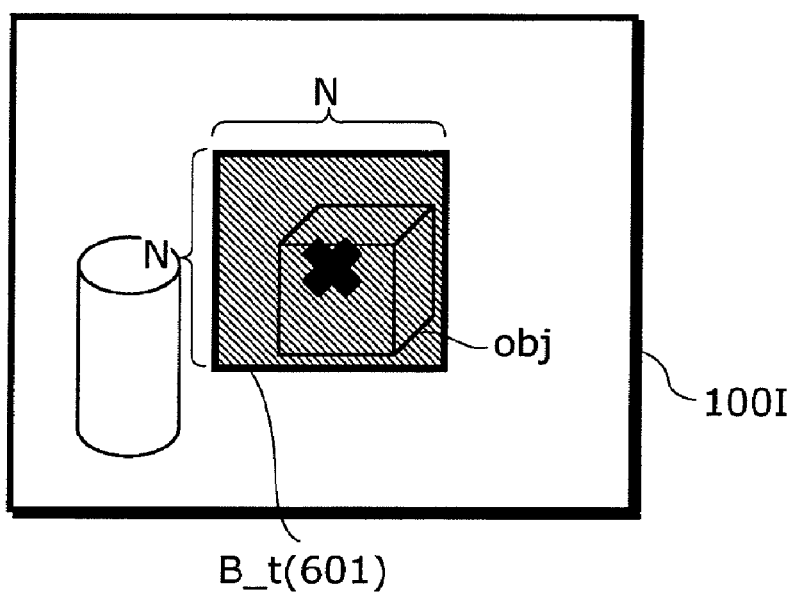
FIG. 16 is a diagram showing an example of setting of a background region candidate according to the second embodiment of the present invention.

FIG. 16 shows a background region candidate B_t.

Next, at Step S1203, as shown in FIG. 15, the setting unit 1102 sets, as the object region candidate O_t, a region of M pixels×M pixels that includes the coordinates designated by the user (where t=1). Likewise, at Step S1204, as shown in FIG. 16, the setting unit 1102 sets, as the background region candidate B_t, a region of N pixels×N pixels that includes the coordinates designated by the user (where t≧1). Here, for example, the background region candidate B_t is larger than the object region candidate O_t (where M<N). It should be noted that, as described later, the object region candidate O_t is the same region (object region candidate 1301) not changing depending on a value of "t" of the object region candidate O_t, for example.

Then, at Step S1205, the histogram generation unit 1103 calculates (a) a color histogram of the object region candidate O_t set at Step S1203 and (b) a color histogram of the background region candidate B_t set at Step S1204. Then, the histogram generation unit 1103 calculates respective normalized histograms by normalizing the color histograms. The method of generating the color histograms and the normalized color histograms are the same as described in the first embodiment.

Next, at Step S1206, the similarity calculation unit 1104 calculates a similarity between the object region candidate O_t and the background region candidate B_t. The previously-mentioned histogram intersection Sob is used as a scale for the similarity calculation.

At Step S1207, the determination unit 1105 compares the similarity to a predetermined threshold value TH. If a determination is made that a value of the similarity is greater than the threshold value TH, then the determination unit 1105 determines that the background region candidate B_t does not completely include color components for the background. Then, the setting unit 1102 expands the background region candidate B_t (in other words, N is increased). Then, the processing of the image processing device 1100 returns to Step S1204.

It should be noted that, in the processing from Steps S1204 to S1207 after the return, a value of "t" is changed to (t+1) that is obtained when the current "t" before the return is increased by 1. Then, after the return, the setting unit 1102 sets the above-mentioned expanded region as a background region candidate B_(t+1). The background region candidate B_(t+1) is, for example, a region including the background region candidate B_t.

As the background region candidate B_t is gradually expanded with the increase of t, a ratio of colors of color components for the object obj to all colors of color components in the background region candidate B_t is increased until the background region candidate B_t almost includes the object obj. Here, a similarity between the object region candidate O_t and the expanded background region candidate B_(t+1) is higher than a similarity between the object region candidate O_t and the background region candidate B_t, which means that the calculated similarity is increased. When the background region candidate 601 is further expanded after the background region candidate includes the entire object obj, a ratio of the colors of the color components for the background to all colors of color components in the background region candidate 601 is increased. Here, a similarity between the object region candidate 501 and the expanded background region candidate 601 is decreased.

This means that, as the size of the background region candidate 601 is changed, the similarity is also changed as the following example. When the background region candidate B_t includes the entire object obj, added pixels that are included in the background region candidate B_(t+1) but not in the background region candidate B_t are pixels not for the object obj. Therefore, a similarity regarding the background region candidate B_(t+1) is lower than a similarity regarding the background region candidate B_t. In other words, the similarity regarding the background region candidate B_(t+1) is lowered in comparison to the similarity regarding the background region candidate B_t. On the other hand, when the background region candidate B_t includes only a part of the object obj, a part of added pixels in the background region candidate B_(t+1) are for the object obj. Thereby, the similarity regarding the background region candidate 601 is increased. It should be noted that, when the background region candidate 601 has a value of "t" resulting in a maximum similarity, it is a region having a shape similar (for example, most similar) to the object obj from among a background region candidate B_1, a background region candidate B_2, . . . .

As described above, the processing from Step S1204 to S1207 is repeated until the similarity becomes lower than the threshold value TH. Here, in the repeated processing, processing of generating the color histograms and the normalized color histograms in the object region candidate 1301 at Step S1205 is not always necessary.

If the similarity is lower than the threshold value TH, the determination unit 1105 determines that the background region candidate B_(t+1) completely includes the color components for the background, and then processing proceeds to Step S1208.

Here, Step S1201 and Step S1202 are the same as Step S201 and Step S202 in the first embodiment, respectively.

Step S1208 and Step S1209 are the same as Step S207 and Step S208 in the first embodiment, respectively.

Third Embodiment

Functions of the units in the object extraction device (namely, the image processing device 100 or the image processing device 1100) in the first or second embodiment are implemented as a program, and the program is installed to a computer. Then, the computer or an apparatus including the computer is used as the object extraction device. In the computer or the like in which the program is installed, the instruction unit 101, the setting unit 102, the histogram generation unit 103, the similarity calculation unit 104, the selection unit 105, and the outline processing unit 106 (the instruction unit 1101, for example) are implemented as processes or program modules.

FIG. 17 is a diagram showing a system 1500.

As shown in FIG. 17, typically, this program is recorded on a storage medium 1509 such as a Compact Disc-Read Only Memory (CD-ROM) or a Digital Versatile Disc-Read Only Memory (DVD-ROM), and installed to a storage device such as a Hard Disk Drive (HDD) 1507 via a drive 1510 and an Input/Output (I/O) 1511. Then, a CPU 1501 executes the program by accessing a Read Only Memory (ROM) 1512, a Random Access Memory (RAM) 1506, an HDD 1507, or the like. Thereby, the object extraction device according to the above embodiments can be implemented.

It is also possible to distribute one or both of the input image 100I and the output image via a network.

The above-described system 1500 (the image processing device 100 or the image processing device 1100) is an image processing device that extracts an object from an image. In order to extract an object, the system 1500 includes the display unit 107 (the display unit 1107), the region instruction processing unit (the instruction unit 101 or the instruction unit 1101), the setting unit 102 (setting unit 1102), the histogram generation unit 103 (the histogram generation unit 1103), the similarity calculation unit 104 (the similarity calculation unit 1104), the selection unit 105 (the determination unit 1105), and the outline processing unit (the outline processing unit 106, the display unit 107, and the like). The display unit 107 (the display unit 1107) displays a received image (input image). The region instruction processing unit (the instruction unit 101 or the instruction unit 1101) sets an initial position of an object in the input image according to instructions from a user. The setting unit 102 (the setting unit 1102) sets at least two sets of a combination of an object region and a background region based on the set initial position. The histogram generation unit 103 (the histogram generation unit 1103) calculates a color histogram of each of the regions in each of the sets (combinations). The similarity calculation unit 104 (the similarity calculation unit 1104) calculates, for each of the combinations, a similarity between (a) a normalized color histogram generated from the color histogram of the object region and (b) a normalized color histogram generated from the color histogram of the background region. The selection unit 105 (the determination unit 1105) selects a combination having the lowest similarity from among the combinations. The outline processing unit (the outline processing unit 106, the display unit 107, and the like) displays an outline of the object region in the selected combination.

Thereby, even if an initial region designated by the user does not include the entire object, it is possible to appropriately extract the entire object.

It should be noted that, as the color histogram of the background region candidate 601, the histogram generation unit 103 (the histogram generation unit 1103) may generate, from the background region candidate 601, a color histogram of a doughnut-shaped region that is included in the background region candidate 601 but does not include the object region candidate 501, for example. Then, the similarity calculation unit 104 or the like may calculate a similarity between the color histogram of the object region candidate 501 and the color histogram of the doughnut-shaped region.

Figure 18:
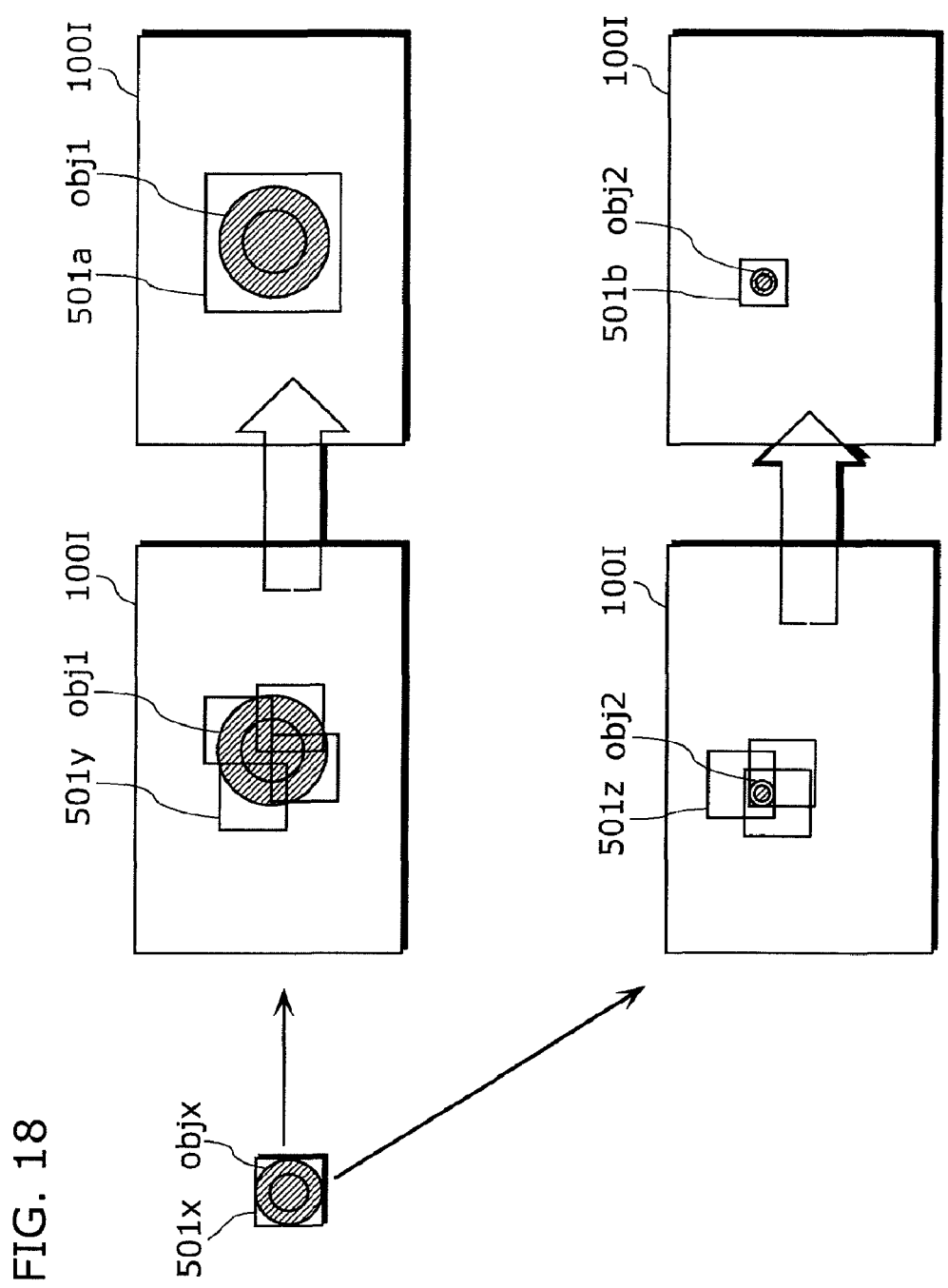
FIG. 18 is a diagram of processing performed by the image processing device to determine a high-accuracy outline.
Figure 19:
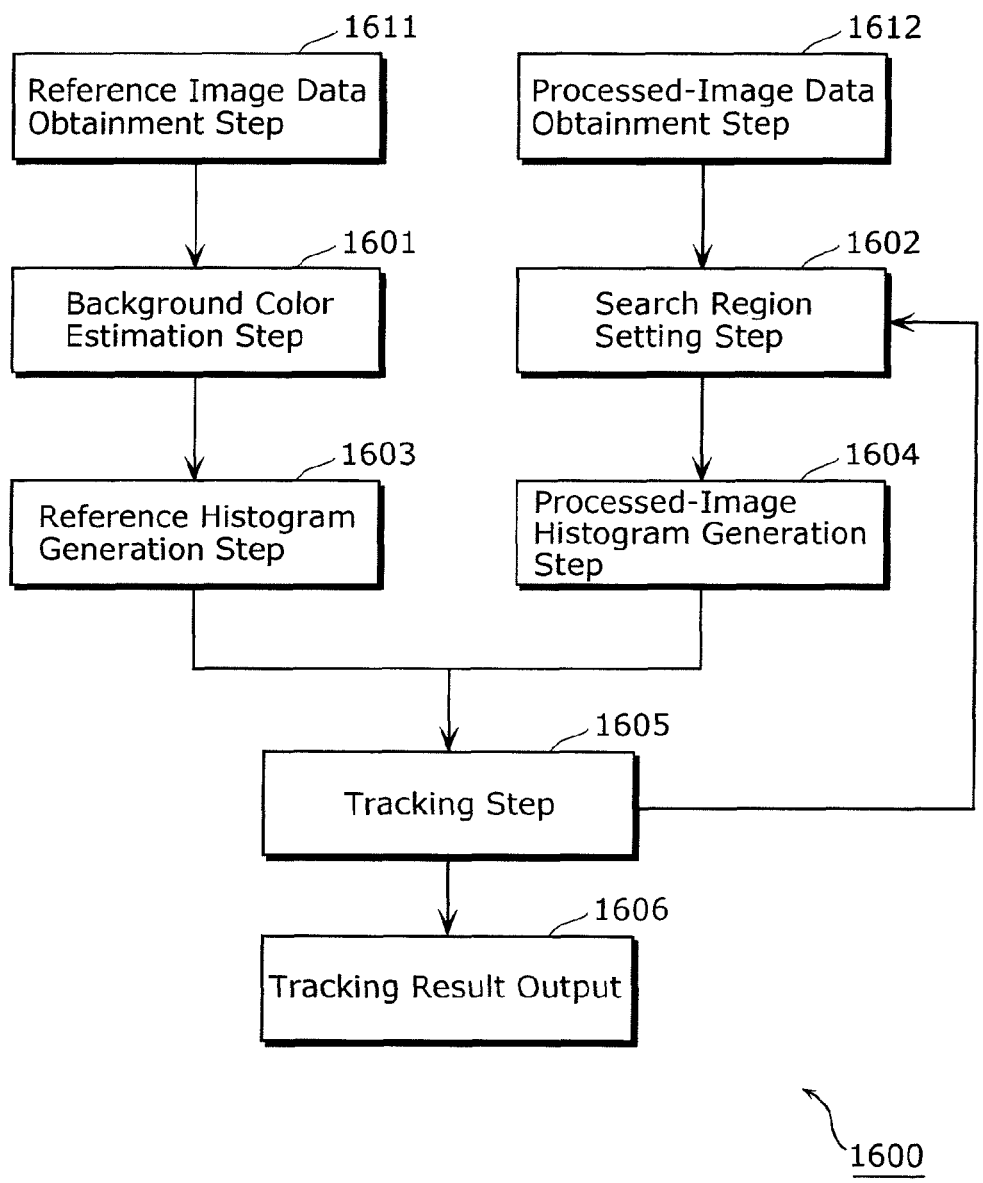
FIG. 19 is a block diagram of the conventional technology.

FIG. 18 is a diagram for explaining the processing performed by the image processing device 100 (the system 1500) to determine a high-accuracy outline of the object.

The image processing device 100 may perform the following processing after selecting a combination.

After selecting a combination, the setting unit 102 determines a plurality of search ranges 501y in a predetermined manner, as shown in upper-middle in FIG. 18. Each of the search ranges is close to the position of the object region candidate 501 in the selected combination.

The histogram generation unit 103 and the similarity calculation unit 104 calculate a similarity regarding each of the determined search ranges 501y. For example, the histogram generation unit 103 and the similarity calculation unit 104 may calculate, for each of the determined search ranges 501y, a similarity between the corresponding search range 501y and the background region candidate 601 in the selected combination. Here, the background region candidate 601 in the selected combination may include all of the search ranges 501y, for example.

The outline processing unit 106 counts the number of similarities each of which having a value greater than a predetermined first threshold value from among the calculated similarities regarding the search ranges 501y. Then, the outline processing unit 106 determines whether or not the counted number is greater than a predetermined second threshold value.

The upper-right diagram in FIG. 18 shows processing performed by the image processing device 100 when a determination is made that the counted number is greater than the second threshold value.

Here, it is assumed that there are two objects having different sizes. A large object obj1 is larger than a small object objx. Therefore, a part of the large object obj1 which is included in any of the search ranges 501y is larger than a part of the small object objx which is included in the same search range 501y. Under the assumption, it is further assumed that, for the large object obj1, the number of similarities each having a value greater than the first threshold value is more than the second threshold value. It is still further assumed that, for the small object objx that is smaller than the large object obj1, the number of similarities each having a value greater than the first threshold value is equal to or less than the second threshold value.

If a determination is made that the number of similarities each having a value greater than the first threshold value is more than the second threshold value, then the outline processing unit 106 determines a large outline 501a as an outline to be displayed by the display unit 107. Thereby, the display unit 107 displays the determined large outline 501a (high-accuracy object region). For example, the large outline 501a has the center located at the same position as the center of the object region candidate 501 in the selected combination, and is larger than the object region candidate 501 in the selected combination. Therefore, the large outline 501a is larger than the object region candidate 501x for the small object objx. It should be noted that, if a determination is made that the number of the similarities each having a value greater than the first threshold value is equal to or less than the second threshold value, the outline processing unit 106 may cause the display unit 107 to display an outline of the object region candidate 501x in the selected combination. Thereby, in the case where the object is the large object obj1, the display unit 107 can display an outline similar to a size of the large object obj1.

In addition, it is also possible that, after Step S205, the outline processing unit 106 determines whether or not each of the similarities calculated at Step S205 in FIG. 2 has a value smaller than a predetermined third threshold value.

The lower-right diagram in FIG. 18 shows processing performed by the image processing device 100 when a determination is made that each of the similarities regarding object region candidates has a value smaller than the third threshold value.

Here, it is assumed that there is a further small object obj2 that is smaller than the small object objx. Therefore, a part of the further small object obj2 which is included in an object region candidate 501x in a combination selected for the further small object obj2 is smaller than a part of the small object objx which is included in the same object region candidate 501z. Under the assumption, it is further assumed that, for the further small object obj2, each of similarities calculated at Step S205 has a value smaller than the predetermined third threshold value.

If a determination is made that each of the similarities calculated at Step S205 has a value smaller than the third threshold value, the outline processing unit 106 determines, as an outline to be displayed by the display unit 107, a small outline 501b as seen in the lower-right diagram in FIG. 18. The small outline 501b is smaller than an outline of the object region candidate 501z in the combination selected for the further small object obj2. For example, the small outline 501b has the center located at the same position as the center of the object region candidate 501x in the combination selected for the small object objx, and is smaller than the object region candidate 501x. On the other hand, if a determination is made that each of the similarities calculated at Step S205 has a value equal to or greater than the third threshold value, the outline processing unit 106 causes the display unit 107 to display an outline of the object region candidate 501x in the combination selected for the small object objx (or the object region candidate 501z in the combination selected for the further small object obj2). Thereby, when the object is small, the display unit 107 can display an outline similar to a size of the object.

As described above, the instruction unit 101 determines a position of an object designated by a user in an image. The setting unit 102 sets regions including the position determined by the instruction unit 101, as the first object region candidate (for example, object region candidate O_t) and the second object region candidate (object region candidate O_(t+1)). For each of four regions which are the two object region candidates and two background region candidates, the histogram generation unit 103 calculates data (a normalized histogram, a color histogram 900) indicating a ratio of pixels of predetermined colors (Q colors) to all pixels in the corresponding region. Regarding each color of the predetermined colors, the similarity calculation unit 104 calculates, for each of the combinations each consisting of an object region candidate and a background region candidate, a similarity between the normalized histogram of the object region candidate and the normalized histogram of the background region candidate. Here, the similarity is higher, as a frequency of the corresponding color of the normalized histogram of the object region candidate is more similar to a frequency of the same color of the normalized histogram of the background region candidate. Then, from the two combinations, the selection unit 105 selects a combination having a lower similarity calculated based on the corresponding object region candidate including the position of the object.

Thereby, it is possible to select a combination in which the object obj is more clearly distinguished from the background.

INDUSTRIAL APPLICABILITY

The image processing device according to the present invention is useful when a user designates an object on an image by coordinates to extract a circumscribed region of the object from the image.

NUMERICAL REFERENCES 100, 1100 image processing device
100I, 301a, 401a input image
101, 1101 instruction unit
102, 1102 setting unit
103, 1103 histogram generation unit
104, 1104 similarity calculation unit
105 selection unit
106, 1106 outline processing unit
107, 1107 display unit
301 coordinates display
301b, 401c, obj object
501, 1301 object region candidate
601 background region candidate
701 circular region
702 elliptic region
703 collective region
1001, 1002 normalized histogram
1003 subtraction result histogram
1105 determination unit
1500 system
1501 CPU
1506 RAM
1507 HDD
1509 storage medium
1510 drive
1511 I/O
1512 ROM

The invention claimed is:

1. An image processing device that extracts an object from an image, said device comprising:
a designation unit configured to designate a position on the image that is received;
a setting unit configured to set a first combination and a second combination that is different from the first combination based on the position designated by said designation unit, the first combination consisting of a first object region candidate and a first background region candidate, and the second combination consisting of a second object region candidate and a second background region candidate;
a histogram generation unit configured to generate a normalized color histogram of the first object region candidate, a normalized color histogram of the first background region candidate, a normalized color histogram of the second object region candidate, and a normalized color histogram of the second background region candidate;
a similarity calculation unit configured to calculate (a) a similarity regarding the first combination and (b) a similarity regarding the second combination, (a) the similarity regarding the first combination being a similarity between the normalized color histogram of the first object region candidate and the normalized color histogram of the first background region candidate, and (b) the similarity regarding the second combination being a similarity between the normalized color histogram of the second object region candidate and the normalized color histogram of the second background region candidate; and
a selection unit configured to select a combination from the first and second combinations based on the similarities calculated by said similarity calculation unit, the selected combination having the similarity lower than the similarity of the combination not selected.

2. The image processing device according to claim 1, wherein said setting unit is configured to
set the first combination and the second combination so that (i) the first object region candidate is identical to the second object region candidate, and that (ii) each of the first and second background region candidates include the first object region candidate, and that (iii) the first and second background region candidates have different sizes.

3. The image processing device according to claim 1, further comprising:
a display unit configured to display the image that is received; and
an outline processing unit configured to display an outline of a region of the object on the image that is received, based on the first or second object region candidate in the selected combination.

4. The image processing device according to claim 1, wherein at least one of the first object region candidate, the second object region candidate, the first background region candidate, the second background region candidate is divided into at least two regions.

5. The image processing device according to claim 1, further comprising
an outline processing unit configured to display, as a region of the object, an outline of the first or second object region candidate in the selected combination.

6. The image processing device according to claim 1, wherein said outline processing unit includes:
an object color estimation unit configured to estimate a color component for the object using (a) the normalized color histogram of the first or second object region candidate in the selected combination and (b) the normalized color histogram of the first or second background region candidate in the selected combination;
an object color extraction unit configured to extract pixels of the color component estimated by said object color estimation unit, using the first or second object region candidate and the first or second background region candidate in the selected combination; and
an object synthesis unit configured to synthesize the pixels extracted by said object color extraction unit into a single object, and to decide the single object to be a region of the object.

7. The image processing device according to claim 1, wherein said designation unit is configured to designate the position by determining, on the image, a position of the object which is designated by a user,
said setting unit is configured to set the first combination and the second combination so that each of the first and second object region candidates includes the position determined by said designation unit,
said histogram generation unit is configured to generate each of the normalized color histograms by calculating data indicating a ratio of (a) pixels of each color of colors of color components to (b) all pixels in a corresponding one of the candidates,
said similarity calculation unit is configured to calculate, for the each color, (a) the similarity regarding the first combination and (b) the similarity regarding the second combination, (a) the similarity regarding the first combination being indicated higher as a frequency of the each color in the normalized color histogram of the first object region candidate is more similar to a frequency of the each color in the normalized color histogram of the first background region candidate, and (b) the similarity regarding the second combination being indicated higher as a frequency of the each color in the normalized color histogram of the second object region candidate is more similar to a frequency of the each color in the normalized color histogram of the second background region candidate, and said selection unit is configured to select a combination from the first and second combinations, the selected combination having the similarity lower than the similarity of the combination not selected.

8. An image processing method of extracting an object from an image, said method comprising:

designating a position on the image that is received;

setting a first combination and a second combination that is different from the first combination based on the position designated in said designating, the first combination consisting of a first object region candidate and a first background region candidate, and the second combination consisting of a second object region candidate and a second background region candidate;

generating a normalized color histogram of the first object region candidate, a normalized color histogram of the first background region candidate, a normalized color histogram of the second object region candidate, and a normalized color histogram of the second background region candidate;

calculating (a) a similarity regarding the first combination and (b) a similarity regarding the second combination, (a) the similarity regarding the first combination being a similarity between the normalized color histogram of the first object region candidate and the normalized color histogram of the first background region candidate, and (b) the similarity regarding the second combination being a similarity between the normalized color histogram of the second object region candidate and the normalized color histogram of the second background region candidate; and selecting a combination from the first and second combinations based on the similarities calculated in said calculating, the selected combination having the similarity lower than the similarity of the combination not selected.

9. A non-transitory computer-readable storage medium on which a program for performing image processing to extract an object from an image is stored computer-readably, the program causing a computer to execute:

designating a position on the image that is received;

setting a first combination and a second combination that is different from the first combination based on the position designated in said designating, the first combination consisting of a first object region candidate and a first background region candidate, and the second combination consisting of a second object region candidate and a second background region candidate;

generating a normalized color histogram of the first object region candidate, a normalized color histogram of the first background region candidate, a normalized color histogram of the second object region candidate, and a normalized color histogram of the second background region candidate;

calculating (a) a similarity regarding the first combination and (b) a similarity regarding the second combination, (a) the similarity regarding the first combination being a similarity between the normalized color histogram of the first object region candidate and the normalized color histogram of the first background region candidate, and (b) the similarity regarding the second combination being a similarity between the normalized color histogram of the second object region candidate and the normalized color histogram of the second background region candidate; and selecting a combination from the first and second combinations based on the similarities calculated in said calculating, the selected combination having the similarity lower than the similarity of the combination not selected.

* * * * *